Nov. 27, 1923.
A. J. WAKEFIELD
PISTON RING REMOVER
Filed Oct. 21, 1921
1,475,665
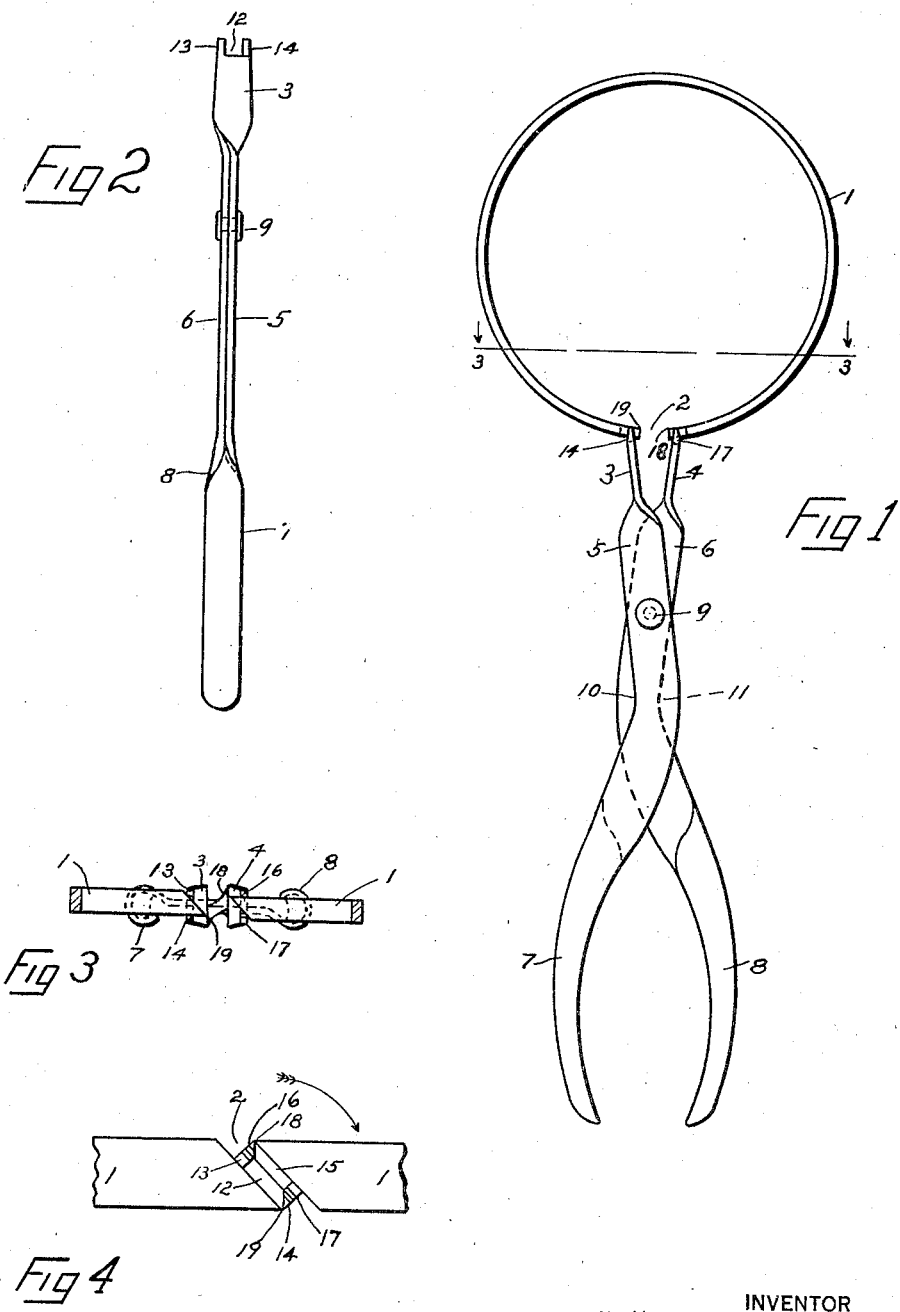
INVENTOR
Arthur J. Wakefield
BY
Henrik J. Schmidt.
ATTORNEY Patented Nov. 27, 1923.

1,475,665

UNITED STATES PATENT OFFICE.

ARTHUR J. WAKEFIELD, OF MIAMI, FLORIDA.

PISTON-RING REMOVER.

Application filed October 21, 1921. Serial No. 509,334.

*To all whom it may concern:*

Be it known that I, ARTHUR J. WAKEFIELD, a citizen of the United States, residing at 217 N. E. First Street, Miami, county of Dade, State of Florida, have invented certain new and useful Improvements in Piston-Ring Removers, of which the following is a specification.

My invention relates to an improvement in piston ring removers and can be used for removing or putting on all the standard makes of piston rings, but is particularly adapted for use on automobile piston rings.

The main and particular objects and advantages of my invention are, to provide a tool which is simple in construction, comparatively inexpensive to manufacture, easy to manipulate and which will not mar nor injure the piston ring grooves or piston rings.

These objects and advantages will be clearly understood from the following specification and drawing, of a preferred construction of the tool, although modifications might be made in these without departing from the scope of my invention.

Fig. 1 is a front view of my invention, showing the tool as it will appear when spreading a piston ring, prior to placing it on the piston.

Fig. 2 is a side view of Fig. 1, but with the piston ring removed.

Fig. 3 is an end view of Fig. 1, shown on line 3—3. Fragments of the piston ring are shown.

Fig. 4 is an enlarged view of fragments of the piston ring, showing the ends of the jaws of the piston ring remover inserted in the slot of the piston ring.

My invention may be described as consisting of a pair of pliers having specially constructed jaws to engage the slot in the piston ring. The pliers being so constructed that when the hand grips are pressed together the jaws will open, thus spreading the slot in the piston ring and enlarging its diameter.

Referring to the various views simultaneously, 1 is a piston ring, 2 the slot in the piston ring in which the jaws 3 and 4 of the piston ring remover engage. The jaws 3 and 4 are formed on the ends of the plier members 5 and 6 and these members terminate in hand grips 7 and 8. These hand grips are made of a shape convenient to the hand of the operator.

The plier members 5 and 6 are pivoted by means of a rivet 9. It will be noted that the plier members 5 and 6, are bent at 10 and 11, respectively, in such a manner that when the hand grips 7 and 8 are brought together the jaws 3 and 4 will separate or open.

The jaw 3 has a slot 12 in its outer end, thus forming two prongs 13 and 14. Similarly jaw 4 has slot 15 and prongs 16 and 17. The prongs 13 and 17 are rectangular in section, while prongs 14 and 16 are triangular in section. The reason for this will be understood by referring to Fig. 4, which shows the jaws 3 and 4 inserted in the slot 2, in the piston ring 1. If the jaws be rotated, as indicated by the arrow, the slot 2 will be widened and the points 18 and 19, on the piston ring, will engage in the slots 12 and 15, in the jaws 3 and 4. The triangular sections of prongs 14 and 16 make this engagement possible.

The points 18 and 19, engaged in the slots 12 and 15, are plainly shown in Fig. 4. The prongs 13, 14, 16 and 17 are also somewhat tapered, as shown on Fig. 1, so as to make it easier to wedge the jaws into the slot 2, in the piston ring. The jaws and prongs are hardened and tempered to give them the necessary strength.

The piston ring remover is used in the following manner:—When it is desired to remove or put on a piston ring, the jaws 3 and 4 are wedged into the slot 2, the tool is then given a slight turn until the points 18 and 19 engage in the slots 12 and 15, in the jaws 3 and 4. The hand grips 7 and 8 are now pressed together, causing the jaws 3 and 4 to separate and thus enlarge the diameter of the piston ring enabling it to pass freely over the piston.

I claim:

In a piston ring remover, of the class described; a pair of pivoted plier members; handle grips provided at one end of each of said plier members; wedge shaped jaws provided at the other ends; each of said jaws provided with one rectangular and one triangular prong; said prongs so located on the jaws that unlike prongs are in juxtaposition when the jaws are closed; and the jaws made of such width that when the prongs are inserted in the angular cut in a piston ring and given a slight rotary motion, the angular ends of the piston ring will enter between the prongs on said jaws, substantially as shown and described.

In testimony whereof, I, ARTHUR J. WAKEFIELD, have signed my name to this specification in the presence of two subscribing witnesses, this 29th day of August, 1921.

ARTHUR J. WAKEFIELD.

Witnesses:
 MARGARETTA C. SCHMIDT,
 CHAS. A. GREEN.